US010580306B1

(12) United States Patent
Harris et al.

(10) Patent No.: US 10,580,306 B1
(45) Date of Patent: Mar. 3, 2020

(54) ACCIDENT RESPONSE TECHNOLOGY

(71) Applicant: BLUEOWL, LLC, San Francisco, CA (US)

(72) Inventors: Steven J. Harris, Saratoga, CA (US); Eric Dahl, Newman Lake, WA (US); Kenneth J. Sanchez, San Francisco, CA (US)

(73) Assignee: BLUEOWL, LLC, San Francisco, CA (US)

( * ) Notice: Subject to any disclaimer, the term of this patent is extended or adjusted under 35 U.S.C. 154(b) by 0 days.

(21) Appl. No.: 15/874,302

(22) Filed: Jan. 18, 2018

Related U.S. Application Data

(60) Provisional application No. 62/447,797, filed on Jan. 18, 2017.

(51) Int. Cl.
    *G08G 1/00*    (2006.01)
    *G01C 21/34*   (2006.01)
    *H04W 4/02*    (2018.01)
    *G06Q 50/30*   (2012.01)
    *H04W 4/40*    (2018.01)

(52) U.S. Cl.
    CPC ......... *G08G 1/205* (2013.01); *G01C 21/3415* (2013.01); *G01C 21/3492* (2013.01); *G06Q 50/30* (2013.01); *H04W 4/025* (2013.01); *H04W 4/40* (2018.02)

(58) Field of Classification Search
    CPC ............................. G06Q 50/265; G08G 1/205
    USPC ........................................................ 340/989
    See application file for complete search history.

(56) References Cited

U.S. PATENT DOCUMENTS

| 9,652,748 | B1 * | 5/2017 | Sanchez | G06Q 10/1095 |
| 2015/0127570 | A1 * | 5/2015 | Doughty | G06Q 50/265 |
| | | | | 705/325 |
| 2018/0218549 | A1 * | 8/2018 | Wahba | B60R 21/00 |

* cited by examiner

*Primary Examiner* — Qutbuddin Ghulamali

(57) ABSTRACT

Systems and methods for improved accident response technology are disclosed. According to certain aspects, a server may receive an indication of an occurrence of an accident event, and may identify a set of vehicles currently operating and suited to assist with the accident event. The server may transmit a notification to one or more of the vehicles that indicates the accident event and enables a vehicle operator to select whether to assist with the accident event. The server may reward the vehicle operator for assisting with the accident event.

18 Claims, 6 Drawing Sheets

ACCIDENT RESPONSE TECHNOLOGY

CROSS-REFERENCE TO RELATED APPLICATIONS

This application claims benefit of the filing date of U.S. Provisional Patent Application No. 62/447,797, filed Jan. 18, 2017 and titled "IMPROVED ACCIDENT RESPONSE TECHNOLOGY," the disclosure of which is hereby incorporated by reference in its entirety.

FIELD

The present disclosure is directed to managing accident instances or events. More particularly, the present disclosure is directed to systems and methods for identifying vehicles located near or predicted to be located near accident locations and incentivizing vehicle operators to assist with individuals involved in the accidents.

BACKGROUND

Individuals have been operating and traveling in vehicles as a means of transportation for decades. Although vehicle operators strive to exercise caution while operating vehicles, accidents and incidents inevitably occur, where some accident events are more serious than others. For example, one accident event may result in minor scratches to one or more involved vehicles, while another accident event many render a vehicle inoperable.

In cases in which an accident event renders a vehicle inoperable (i.e., an individual(s) is unable to operate the vehicle) or results in the individual(s) needing medical attention, the individual(s) may be without transportation to his or her intended destination or to a medical care facility. While the individual(s) may explicitly arrange for or undertake alternative transportation (e.g., walk, take a taxi) to the intended or alternate destination, or wait for appropriate medical personnel (e.g., an ambulance), this is often an inconvenience and may generally lack efficiency.

Accordingly, there is an opportunity for systems and methods to dynamically and automatically facilitate assistance in response to accident events.

SUMMARY

According to embodiments, a computer-implemented method of facilitating assistance in response to accident events is provided. The method may include receiving, via at least one network connection, an indication of an accident event that occurred at an accident location, and in response to receiving the indication, identifying a set of vehicles currently in operation at a corresponding set of locations. The method may further include, for each of the set of vehicles: accessing a historical driving record for the vehicle, and determining, from the historical driving record, a predicted travel route for the vehicle. Further, the method may include identifying, from the predicted travel routes for the set of vehicles, a vehicle of the set of vehicles predicted to travel in proximity to the accident location; and transmitting a notification to an electronic device associated with the vehicle via at least one network connection, the notification indicating the accident event.

In another embodiment, a system for facilitating assistance in response to accident events is provided. The system may include a transceiver configured to communicate via at least one network connection, a memory configured to store non-transitory computer executable instructions, and a processor configured to interface with the transceiver and the memory. The processor may be configured to execute the non-transitory computer executable instructions to cause the processor to receive, via the transceiver, an indication of an accident event that occurred at an accident location, and in response to receiving the indication, identify a set of vehicles currently in operation at a corresponding set of locations. For each of the set of vehicles, the processor may be configured to access a historical driving record for the vehicle, and determine, from the historical driving record, a predicted travel route for the vehicle. The processor may be further configured to identify, from the predicted travel routes for the set of vehicles, a vehicle of the set of vehicles predicted to travel in proximity to the accident location, and transmit, via the transceiver, a notification to an electronic device associated with the vehicle, the notification indicating the accident event.

DETAILED DESCRIPTION

Figure 1:
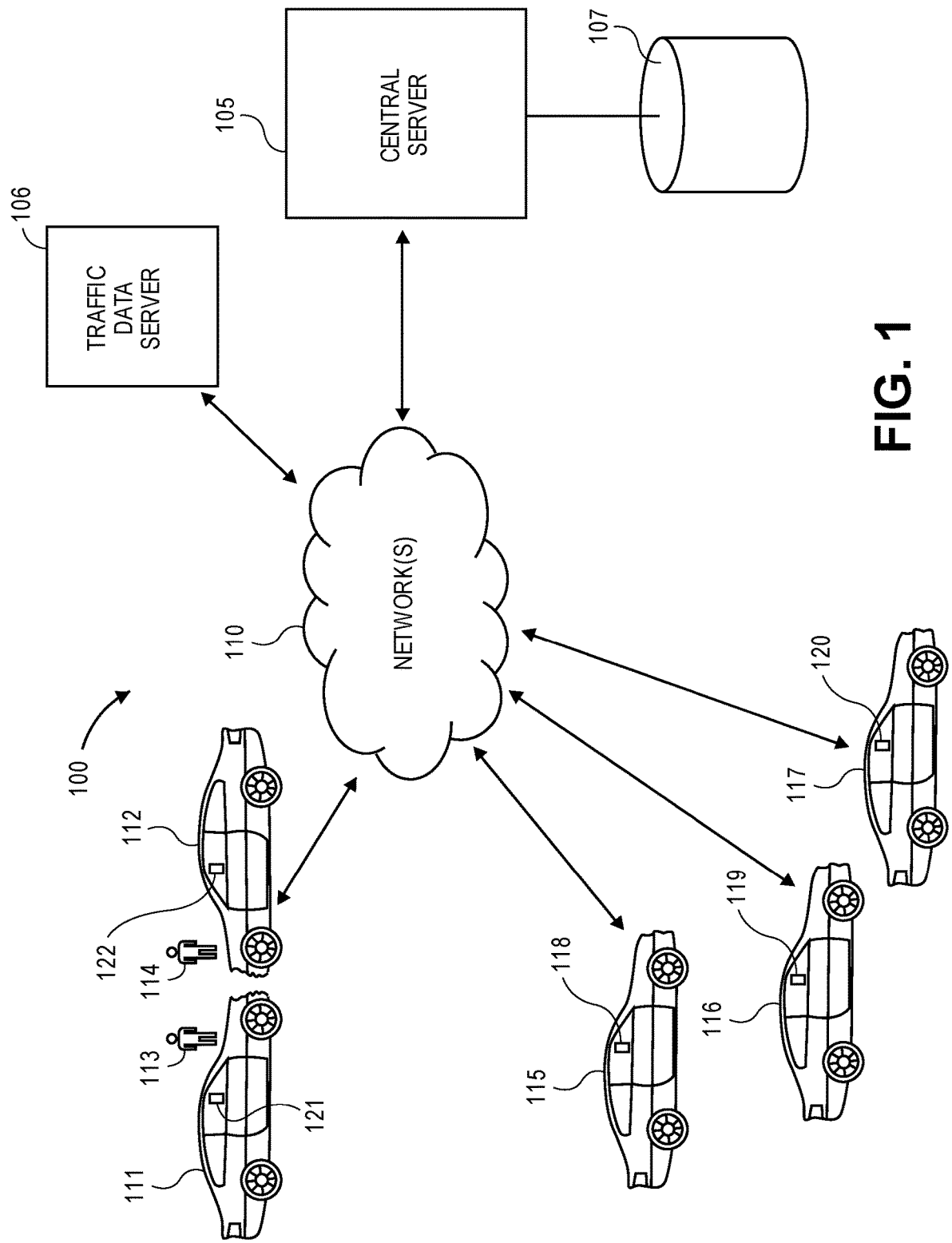
FIG. 1 depicts an overview of an exemplary system of components configured to facilitate various functionalities, in accordance with some embodiments.

The present embodiments may relate to, inter alia, detecting accident events, and facilitating and managing assistance associated with the accident events. In a typical scenario involving an accident event, there may be one or more affected vehicles (and impacted individuals associated with the vehicle(s)), as well as numerous unaffected vehicles that may be operating near the accident event. However, there is no existing technique for leveraging these unaffected vehicles to provide assistance to the accident event. Instead, individuals involved in certain accident events must arrange alternative transportation for transport to an intended destination or must wait for ascertained medical attention (e.g., an ambulance).

According to certain aspects, a server may receive an indication of an accident event involving at least one vehicle, where the accident event may indicate an accident location as well as information related to whether any individuals need assistance, such as medical attention or the need to be transported elsewhere (e.g., an intended destination). The server may retrieve operation data from a set of additional vehicles that are not involved in the accident event, and may analyze historical driving records for the set of additional vehicles.

Based on the analysis of the historical driving records, the server may identify one or more of the set of additional vehicles that are suited or equipped to assist with the accident event, such as a vehicle that is predicted to travel in proximity to the accident location in a relatively short amount of time. The server may generate and transmit a notification to the identified vehicle that identifies the accident event and enables an operator of the identified vehicle to select whether to assist with the accident event. According to some embodiments, an operator of the identified vehicle may be offered an incentive or reward for assisting with the accident event.

The systems and methods therefore offer numerous benefits. In particular, individuals who are involved in accident events may be afforded more efficient and effective assistance when other vehicle operators are notified of the accident events. This more efficient and effective assistance may enable affected individuals with more prompt medical attention and/or with a way to reach an intended destination. Further, individuals such as other vehicle operators who choose to assist with the accident events may gain altruistic benefits and/or may be rewarded with various incentives or rewards. It should be appreciated that other benefits are envisioned.

The systems and methods discussed herein address a challenge that is particular to accident response technology. In particular, the challenge relates to a difficulty in effectively and efficiently identifying the occurrence of accident events and facilitating assistance to the accident events. This is particularly apparent when accident events occur in remote locations located further from dedicated assistance, or in crowded locations which may make getting to the accident location more difficult. In conventional situations, dedicated assistance (e.g., an ambulance or a family member) is notified of an accident event and may provide assistance where needed or possible. In contrast, the systems and methods utilize network connections to leverage vehicles already in a vicinity of the accident event and/or predicted to travel in proximity to the accident event. Therefore, because the systems and methods employ the collection, compiling, analyzing, and communicating of data associated with facilitating assistance to accident events, the systems and methods are necessarily rooted in computer technology in order to overcome the noted shortcomings that specifically arise in the realm of accident response technology.

According to implementations, the systems and methods may support a dynamic, real-time or near-real-time collection, analysis, and communication of any data that may be associated with accident events. In particular, the systems and methods may dynamically and automatically collect operation data from vehicles in real-time or near-real-time, may automatically and dynamically analyze the collected data, and may automatically and dynamically generate and communicate notifications that indicate relevant information. In this regard, any individuals involved in accident events are afforded the benefit of effective assistance being initiated in real-time or near-real-time.

FIG. 1 illustrates an overview of a system 100 of components configured to facilitate the systems and methods. It should be appreciated that the system 100 is merely exemplary and that alternative or additional components are envisioned.

As illustrated in FIG. 1, the system 100 depicts an accident event that may occur between a vehicle 111 and a vehicle 112. It should be appreciated that an accident event may involve a single vehicle, such as if the vehicle collides with an object. Further, the term "accident event" as used herein may be used to refer to any accident or incident involving one or more vehicles that collide with each other, and/or make contact with one or more other objects and/or individuals. It should be appreciated that an accident event may also refer to an instance in which a vehicle breaks down, experiences a malfunction, or otherwise ceases to operate. Certain accident events may result in one or more affected or impacted individuals. In particular, as illustrated in FIG. 1, the vehicle 111 has at least one associated individual 113 (such as an operator or passenger of the vehicle 111), and the vehicle 112 has at least one associated individual 114 (such as an operator or passenger of the vehicle 112).

Further, the vehicle 111 has an associated electronic device 121 and the vehicle 112 has an associated electronic device 122. According to embodiments, each of the electronic devices 121, 122 may be configured with any combination of software and hardware components. In some implementations, each of the electronic devices 121, 122 may be included as part of an on-board diagnostic (OBD) system or any other type of system configured to be installed in the respective vehicle 111, 112, such as an original equipment manufacturer (OEM) system. In other implementations, each of the electronic devices 121, 122 may belong to the respective individuals 113, 114. In particular, the electronic devices 121, 122 may be any type of electronic device such as a mobile device (e.g., a smartphone), notebook computer, tablet, phablet, GPS (Global Positioning System) or GPS-enabled device, smart watch, smart glasses, smart bracelet, wearable electronic, PDA (personal digital assistants), pager, computing device configured for wireless communication, and/or the like.

Each of the electronic devices 121, 122 may include a set of sensors configured to detect and record various telematics data associated with the respective vehicles 111, 112. In some implementations, each of the electronic devices 121, 122 may be configured to communicate with (i.e., request, retrieve, or receive data from) a set of sensors disposed within the respective vehicles 111, 112. According to embodiments, the set of sensors included in the electronic devices 121, 122 or otherwise configured to communicate with the electronic devices 121, 122 may be of various types. For example, the set of sensors may include a location module (e.g., a global positioning system (GPS) chip), an image sensor, an accelerometer, an ignition sensor, a clock, speedometer, a torque sensor, a throttle position sensor, a compass, a yaw rate sensor, a tilt sensor, a steering angle sensor, a brake sensor, and/or other sensors. It should be appreciated that additional sensors are envisioned.

The system 100 may further include a central server 105 that may be configured to communicate with the electronic devices 121, 122 via one or more networks 110. In certain embodiments, the network(s) 110 may support any type of data communication via any standard or technology (e.g., GSM, CDMA, TDMA, WCDMA, LTE, EDGE, OFDM, GPRS, EV-DO, UWB, Internet, IEEE 802 including Ethernet, WiMAX, Wi-Fi, Bluetooth, and others). The central server 105 may be configured to interface with or support a memory or storage 107 capable of storing various data.

Additionally, the system 100 may include a traffic data server 106 that may be configured to communicate with the central server 105 and the electronic devices 121, 122 via the network(s) 110. Generally, the traffic data server 106 may receive, access, and compile data (such as data from the electronic devices 121, 122) indicative of vehicle operation conditions, such as traffic flow information, road construction, accident event information, and/or other data. According to embodiments, the traffic data server 106 may detect when an accident event has occurred and may identify information associated with the accident event, such as which and how many vehicles are involved, the location of the accident event, the condition or status of individuals who may be affected by the accident event, and/or other information.

The central server 105 may communicate with the traffic data server 106 via the network(s) 110 to retrieve or be notified of the accident events. In an implementation, the central server 105 itself may receive, access, and compile the data (such as data from the electronic devices 121, 122) indicative of the vehicle operation conditions, and may determine or identify accident events and information associated therewith.

The system 100 may further include a set of additional vehicles 115, 116, 117 each having an associated electronic device 118, 119, 120. According to embodiments, the electronic devices 118, 119, 120 may be similar to the electronic devices 121, 122 in that the electronic devices 118, 119, 120 may be associated with the vehicles 115, 116, 117 themselves or with individuals associated with the vehicles 115, 116, 117 (e.g., operators of the vehicles 115, 116, 117). Accordingly, the central server 105 and/or the traffic data server 106 may communicate with the electronic devices 118, 119, 120 via the network(s) 110 to retrieve relevant vehicle operation data. In particular, the vehicle operation data may indicate whether the respective vehicles 115, 116, 117 are operating, velocity data, location data, bearing or heading data, intended route information, and/or other data.

The storage 107 may be configured to store historical driving records associated with the vehicles 115, 116, 117, where the historical driving records may indicate certain previous operation data associated with the vehicles 115, 116, 117. In particular, the historical driving records may include previous trips or routes completed by the vehicles 115, 116, 117, as well as when the trips were completed, directions of travel, vehicle speeds, and/or other information.

Figure 2:
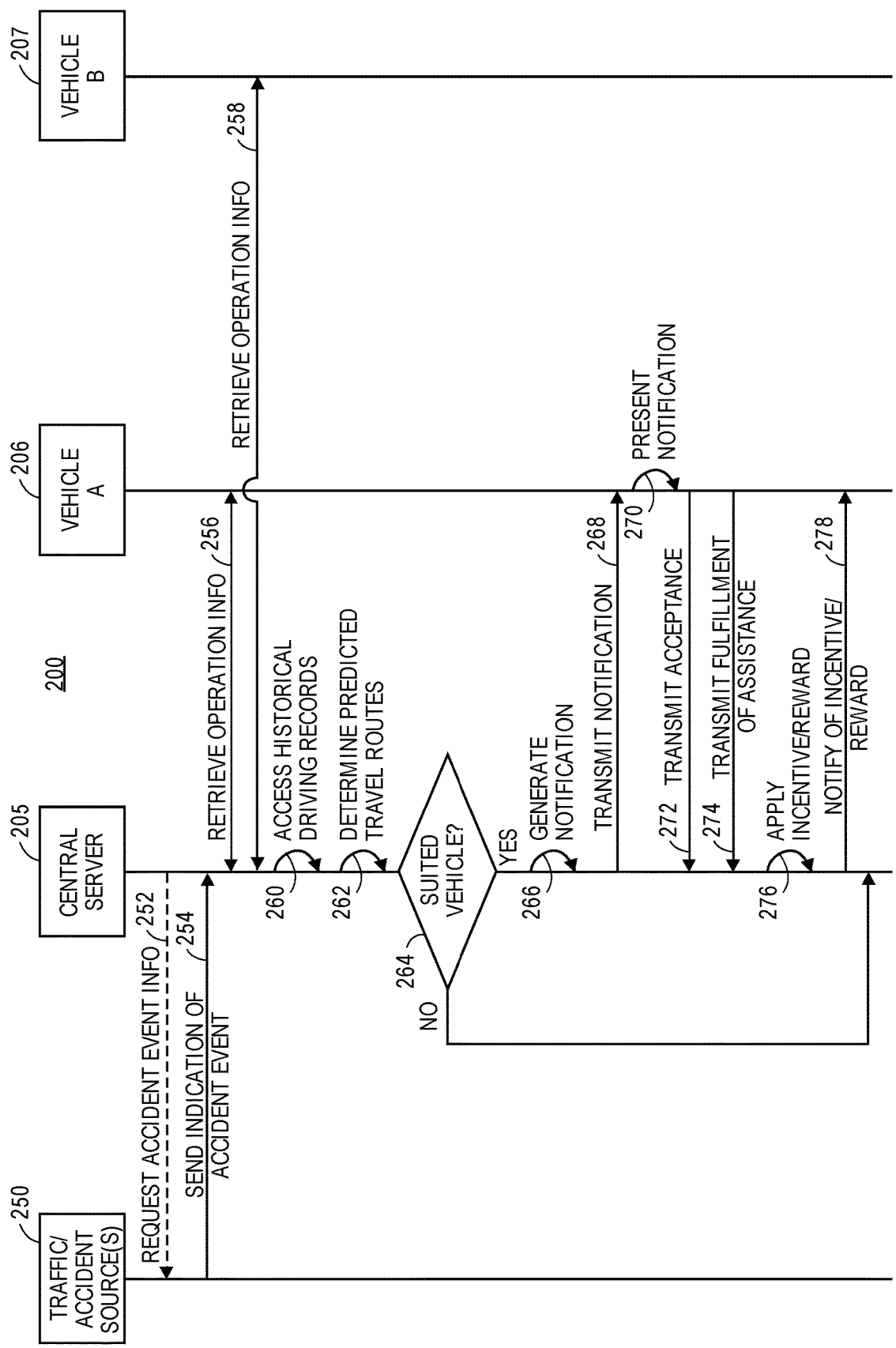
FIG. 2 depicts an exemplary signal diagram associated with facilitating assistance in response to accident events, in accordance with some embodiments.

According to embodiments, when the central server 105 detects an accident event, the central server 105 may leverage the vehicles 115, 116, 117 to facilitate certain actions intended to provide assistance to the individuals 113, 114 involved in the accident event, as described herein with respect to FIG. 2.

FIG. 2 depicts a signal diagram 200 associated with certain functionalities related to assisting with accident events. The signal diagram 200 includes various components including: one of more traffic/accident sources 250, a central server 205 (such as the central server 105 as discussed with respect to FIG. 1), a vehicle A 206, and a vehicle B 207. In some embodiments, the accident source(s) 250 may be a vehicle (or an electronic device associated with the vehicle) that is involved in an accident event. In alternative or additional embodiments, the accident source(s) 250 may be a data source that compiles information associated with traffic and/or accidents (such as the traffic data server 106 as discussed with respect to FIG. 1). Further, each of vehicle A 206 and vehicle B 207 may be a vehicle not involved in the accident event, or otherwise operating normally.

It should be appreciated that each of vehicle A 206 and vehicle B 207 may have an associated electronic device, such as an electronic device belonging to a passenger or operator of the vehicle 206, 207, or an on-board device installed within the vehicle 206, 207. According to embodiments, the associated electronic devices of the vehicles 206, 207 may interface and communicate with the central server 205 according to the signal diagram 200. As such, it should be understood that any descriptions relating to communications with the vehicles 206, 207 may extend to communications with the electronic devices of the vehicles 206, 207.

The signal diagram 200 may begin with the central server 205 optionally requesting (252) accident event information from the accident source(s) 250. According to embodiments, the central server 205 may automatically request the accident event information periodically (e.g., once every ten seconds, once every minute, once every hour), or a user of the central server 205 may cause the central server 205 to request the accident event information.

The accident source(s) 250 may send (254) an indication of an accident event to the central server 205. In some implementations, the accident source(s) 250 may send the indication of the accident event in response to receiving a request from the central server 205. In another implementation, the accident source(s) 250 may automatically send the indication of the accident event in response to detecting the occurrence of the accident event. For example, if the accident source(s) 250 is a vehicle (or an electronic device associated therewith) involved in the accident event, then the vehicle (or the electronic device associated therewith) may send the indication to the central server 205 in response to detecting the accident event (e.g, via sensor data). For further example, if the accident source(s) 250 is a data source of compiled data (e.g., the traffic data server 106), then the data source may send the indication to the central server 205 in response to receiving a notification of the accident event.

In embodiments, the indication may include information related to the accident event such as any vehicle(s) involved in the accident event, passengers or drivers of the vehicle(s), extent of damage, location of the accident event, information related to any injuries suffered by individuals associated with the accident event (including any passer-by individuals), intended destinations of the individuals, and/or other information.

The central server 205 may retrieve (256) operation information from vehicle A 206 and may retrieve (258) operation information from vehicle B 207. According to embodiments, the operation information for each of vehicle A 206 and vehicle B 207 may include various information associated with the operating status of the vehicles 206, 207 such as location, engine state (e.g., off/on), movement data (e.g., velocity, bearing), current occupancy, and/or other operating data. The operation information may also include information associated with the vehicles 206, 207 themselves, such as make, model, year, occupancy capability, and/or other information. In an implementation, the central server 205 may automatically, and in real-time or near-real-time, retrieve the operation information from the vehicles 206, 207 in response to receiving the indication of the accident event. In another implementation, the vehicles 206, 207 may continuously provide the operation information to the central server 205 during operation of the vehicles 206, 207. Accordingly, in either implementation, the central server 205 may have access to a current, real-time, or near-real-time snapshot of the operation of the vehicles 206, 207.

The central server 205 may access (260) historical driving records that may be associated with vehicle A 206 and/or vehicle B 207. According to embodiments, the historical driving records may include a set of travel routes previously completed by the vehicles 206, 207, where each travel route may be defined by various information including starting location, ending location, duration, time, date, and/or other information. Accordingly, the set of travel routes may indicate which routes are frequently (or infrequently) undertaken or completed by the vehicles 206, 207. For example, the historical driving records may indicate the normal or standard weekday commutes completed by the vehicles 206, 207.

The central server 205 may determine (262), based on the historical driving records, predicted travel routes for vehicle A 206 and/or vehicle B 207. In some implementations, the central server 205 may determine the predicted travel routes based on both the historical driving records and the operation information received from the vehicles 206, 207. The predicted travel routes may be, in one scenario, routes that are frequently completed by the vehicles 206, 207 (e.g., a daily commute route). In determining a predicted travel route for a vehicle, the central server 205 may determine, from the operation information, that the corresponding vehicle is currently on one of the set of travel routes included in the historical driving record.

Further, in determining a predicted travel route for a vehicle, the central server 205 may interface with or access other data or information that may be relevant to an intended destination of the vehicle. For example, the central server 205 may access various applications (e.g., calendar application, messaging application) associated with the electronic devices of the vehicles 206, 207, where the information from the applications may indicate intended destinations, intended routes, and/or other information that may be relevant for the central server 205 to determine a predicted travel route.

The central server 205 may determine (264) whether either or both of vehicle A 206 or vehicle B 207 is suited to assist with the accident event. In particular, the central server 205 may determine whether any of the predicted travel routes determined in (262) coincide with the location of the accident event (i.e., whether either of the vehicles 206, 207 is predicted to travel in proximity to the location of the accident event). The central server 205 may determine that a vehicle is suited to assist with the accident event if the vehicle is predicted to travel to or by the location of the accident event, or travel within a specified range of the location of the accident event (e.g., within one mile of the location of the accident event). The central server 205 may also account for whether the vehicle is already past the location of the accident event or whether the vehicle is traveling in the direction of (or away from) the accident event. The central server 205 may also account for additional operation information of the vehicles 206, 207, such as current occupancy (i.e., whether the vehicles 206, 207 have capacity to pick up individual(s) associated with the accident event), whether the vehicles 206, 207 are transporting needed medical supplies, and/or other information.

In some situations, the central server 205 may determine that both vehicle A 206 and vehicle B 207 are suited to assist with the accident event, in which case the central server 205 may determine which vehicle is better suited to assist. In determining which vehicle is better suited to assist, the central server 205 may account for an estimated time for the respective vehicle to travel from its current location to the location of the accident event, a distance between the respective vehicle and the location of the accident event (as well as how close the respective vehicle is predicted to get to the location of the accident event), a current occupancy of the respective vehicle (i.e., whether the respective vehicle has availability to pick up individuals), a direction of travel of the vehicle, whether the vehicle is carrying needed medical supplies, an intended destination of any affected individual(s) and/or whether the intended destination matches or is similar to an intended destination of the vehicles 206, 207, and/or other factors. It should be appreciated that the central server 205 may apply weights to the various factors in making the determination. Further, it should be appreciated that the central server 205 may perform the determination using various techniques, algorithms, calculations, and/or the like. For explanatory purposes, it should be understood that the central server 205 determines that vehicle A 206 is suited to assist with the accident (or that vehicle A 206 is better suited to assist than is vehicle B 207).

According to embodiments, there may be an incentive or reward associated with assisting with the accident event, where the incentive or reward may be in the form of a monetary amount, points or credits, discounts on products or services, recognition in some capacity, and/or other incentives or rewards. Further, assisting with the accident event may involve picking up one or more passengers associated with the accident event (such as if the affected vehicles are unable to operate) and transporting them to a destination (e.g., an original intended destination, a medical care facility), providing medical services or supplies to any individuals affected by the accident event, and/or performing other actions. It should be appreciated that the incentive or reward may vary based on the action to be performed, a distance to the accident event, and/or other factors.

Although not depicted in FIG. 2, the central server 205 may interface with the accident source(s) 250 to determine what, if any, assistance is needed in association with the accident event. For example, an individual involved in the accident event may indicate (e.g., via an electronic device) that his/her vehicle is inoperable and may request that he/she needs to be picked up and/or may indicate an intended destination. For further example, the individual may indicate a specific type of medical treatment that is needed. The central server 205 may perform the determination of (264) based on the any information received from the accident source(s) 250.

The central server 205 may generate (266) a notification including information associated with the accident event. In embodiments, the central server 205 may determine a travel route between the current location of vehicle A 206 and the location of the accident event (which may or may not coincide with the predicted travel route). Further, the central server 205 may estimate, based on the current location of vehicle A 206, an amount of time for vehicle A 206 to reach the location of the accident event. The central server 205 may include, in the notification, the determined travel route, the estimated amount of time, the assistance to be performed (e.g., pick up a passenger), identifications of any individuals that need assistance, and the incentive or reward for performing the assistance.

The central server 205 may transmit (268) the notification to vehicle A 206 (or to an electronic device associated therewith). In embodiments, the central server 205 may automatically transmit the notification to vehicle A 206 in response to generating the notification. After receiving the notification, vehicle A 206 (or the electronic device associated therewith) may present (270) the notification to an individual associated with vehicle A 206. In particular, vehicle A 206 (or the electronic device) may present the notification to an operator of vehicle A 206 via a user interface so that the operator may view the information included in the notification. The individual may select, via the user interface, to accept or deny providing assistance according to the information of the notification.

If the individual selects to provide assistance, vehicle A 206 (or the electronic device) may transmit (272) an acceptance to the central server 205. At this point, the individual associated with vehicle A 206 may proceed to appropriately facilitate assistance with the accident. When the individual completes the assistance, vehicle A 206 (or the electronic device) may transmit (274) a fulfillment of the assistance to the central server 205. In one implementation, the individual may confirm via the electronic device that the appropriate assistance has been fulfilled. For example, the individual may confirm via a user interface that an identified individual associated with the accident has been picked up. In another implementation, vehicle A 206 (or the electronic device) may automatically determine that the appropriate assistance has been fulfilled, such as by assessing operation information associated with vehicle A 206. In another implementation, not illustrated in FIG. 2, the individual in need of assistance may confirm that the assistance has been fulfilled (e.g., via an electronic device).

The central server 205 may apply (276) the incentive or reward to an account associated with the individual who performed the assistance (e.g., an operator of vehicle A 206). The incentive or reward may match the incentive or reward that was indicated in the notification. By the central server 205 applying the incentive or reward to the account, the individual may be able to access or redeem the incentive or reward, as appropriate. It should be appreciated that the central server 205 may deliver or otherwise provide the incentive or reward to the individual in other ways. The central server 205 may also notify (278) vehicle A 206 that the incentive or reward has been applied to the account.

Figure 3:
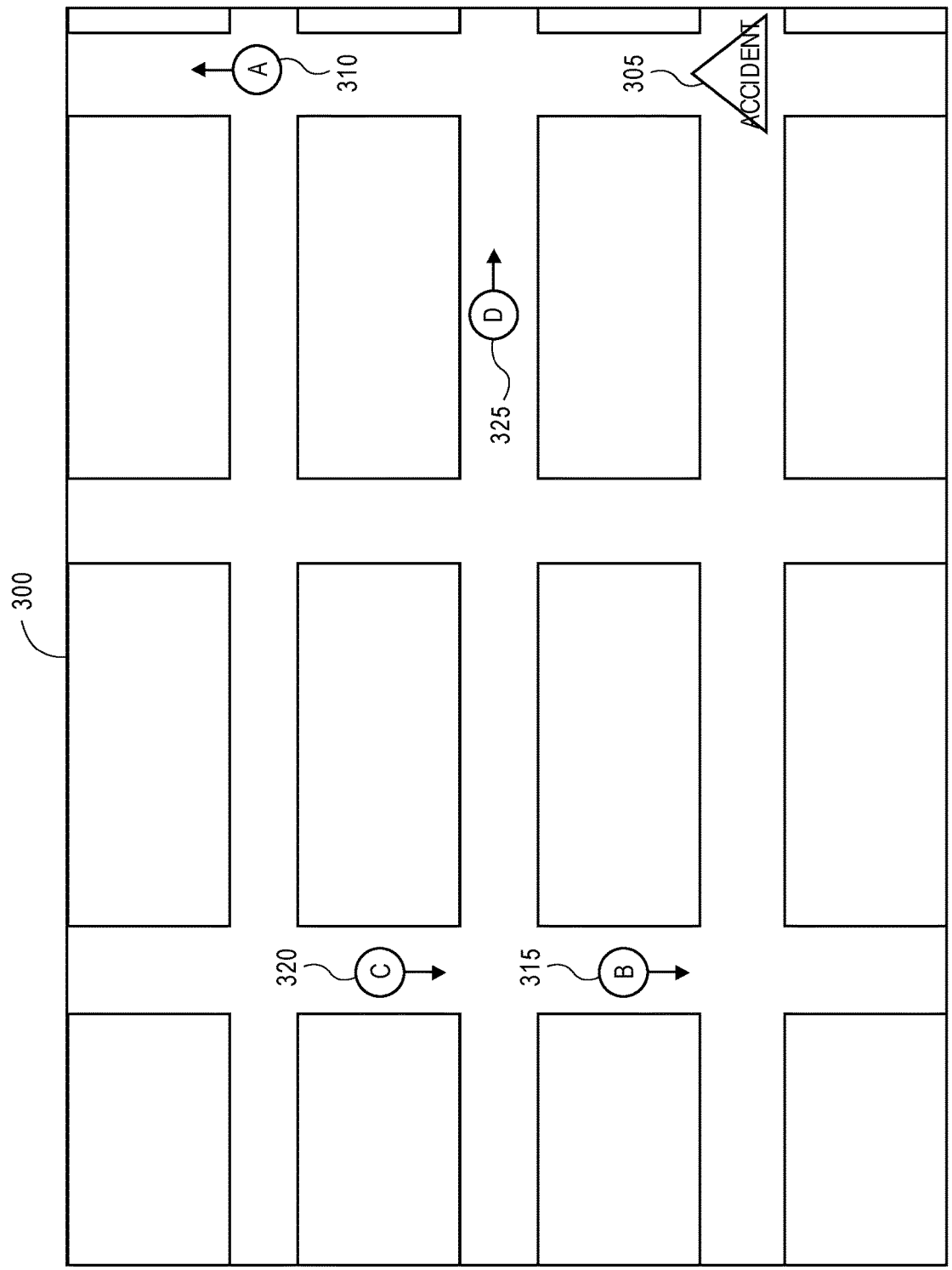
FIG. 3 depicts an exemplary accident event scenario, in accordance with some embodiments.

FIG. 3 depicts an exemplary accident event scenario 300 that may be assessed by a central server. The scenario 300 depicts an accident 305 that has occurred at an accident location. Although not shown in FIG. 3, it may be assumed that there are one or more vehicles involved in and one or more individuals affected by the accident 305. The scenario 300 further depicts a set of vehicles in an area near the accident 305: vehicle A 310, vehicle B 315, vehicle C 320, and vehicle D 325. The scenario depicts, as an arrow, a bearing or direction of travel for each of the vehicles 310, 315, 320, 325.

According to embodiments, in response to detecting the accident 305, the central server may retrieve operation data associated with the vehicles 310, 315, 320, 325 and may analyze the operation data to identify which of the vehicles 310, 315, 320, 325 may be better suited to potentially assist with the accident 305. In particular, the central server may determine a distance between each of the vehicles 310, 315, 320, 325 and the accident 305, as well as a predicted route for each of the vehicles 310, 315, 320, 325.

As illustrated in FIG. 3, vehicle A 310 is closer to the accident 305 than are vehicle B 315 and vehicle C 320; however vehicle A 310 is traveling in a direction away from the accident 305, so the central server may determine that either vehicle B 315 or vehicle C 320 is better suited than vehicle A 310 to assist with the accident 305. Further, vehicle D 325 is closer to the accident 305 than are vehicle B 315 and vehicle 320, and is traveling in a direction towards the accident 305, so the central server may determine that vehicle D 325 is better suited than vehicle B 315 and vehicle C 320 to assist with the accident 305.

Figures 4A, 4B:
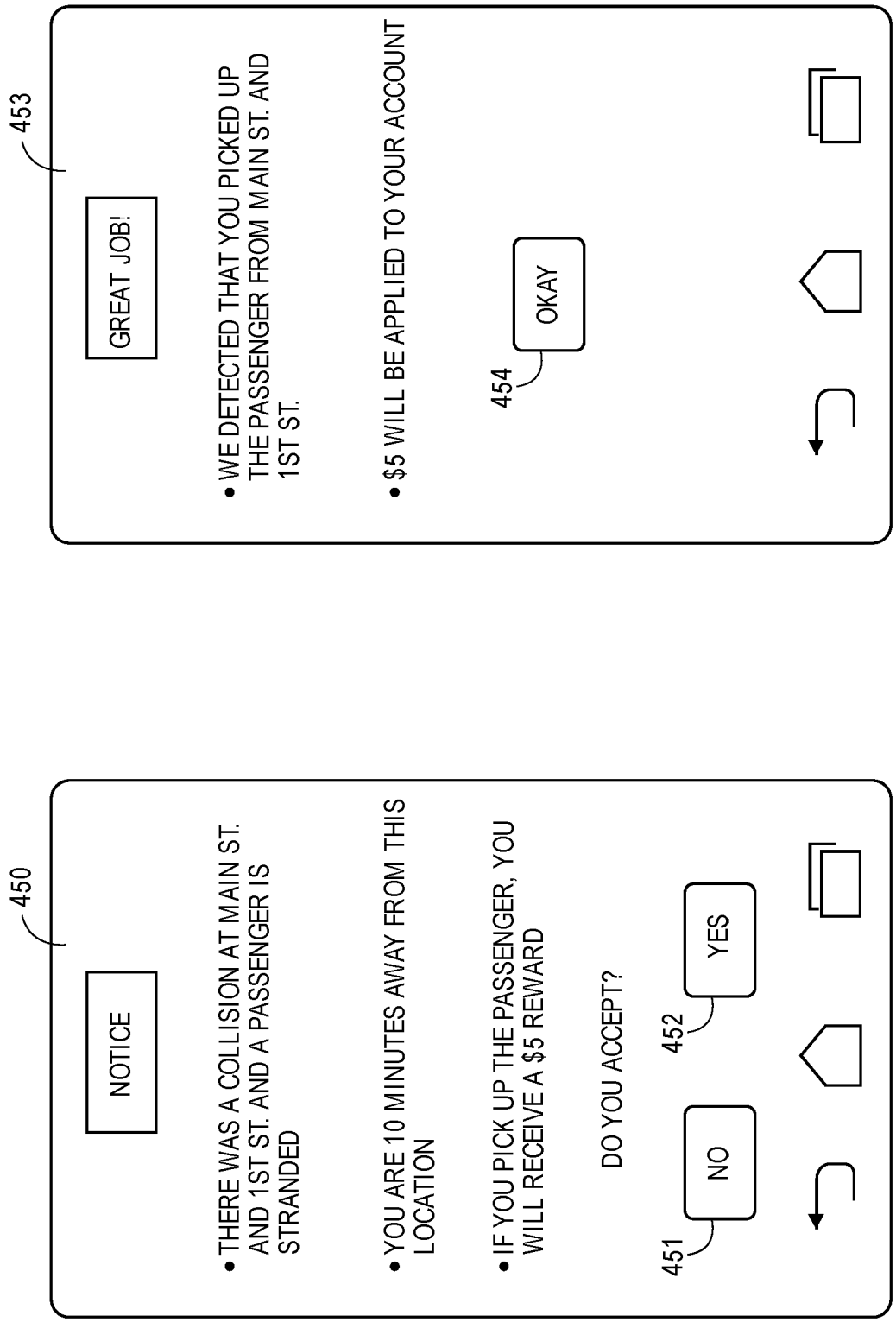
FIGS. 4A and 4B depict exemplary user interfaces associated with notifications indicating accident events, in accordance with some embodiments.

FIGS. 4A and 4B illustrate exemplary interfaces associated with notifying an individual of an accident event. An electronic device (e.g., a mobile device, such as a smartphone) may be configured to display the interfaces and/or receive selections and inputs via the interfaces, where the electronic device may be associated with an operator of a vehicle, or may be integrated into the vehicle. For example, a dedicated application that is configured to operate on the electronic device may display the interfaces. It should be appreciated that the interfaces are merely exemplary and that alternative or additional content is envisioned.

FIG. 4A illustrates an interface 450 indicating an accident event (in particular, a collision at Main St and $1^{st}$ St) resulting in a stranded passenger. The interface 450 further indicates that the vehicle is estimated to be ten (10) minutes away from the location of the accident event, and indicates a reward of $5 for the vehicle operator to pick up the passenger. The interface 450 enables the vehicle operator to select to pick up the passenger via a "NO" selection 451 or a "YES" selection 452.

FIG. 4B illustrates an interface 453 indicating that the vehicle operator has picked up the passenger from the location of the accident event. In a particular implementation, a server may automatically detect that the passenger has been picked up via analyzing various data including location data. The interface 453 further indicates that the $5 reward will be applied to an account of the vehicle operator. The interface 453 enables the vehicle operator to dismiss the interface 453 via an "OKAY" selection 454.

Figure 5:
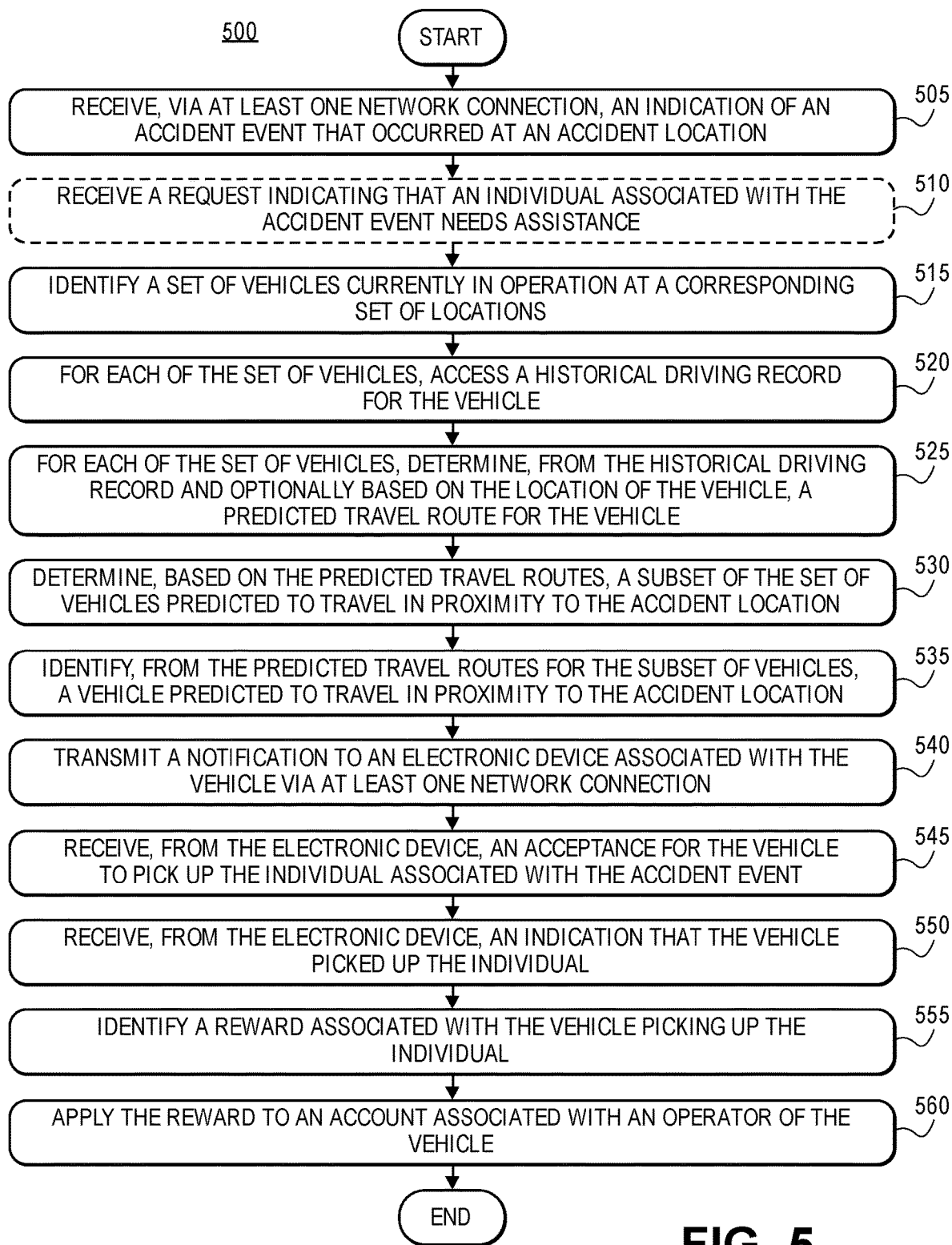
FIG. 5 is a flow diagram associated with facilitating assistance in response to accident events, in accordance with embodiments.

FIG. 5 depicts a block diagram of an exemplary method 500 of facilitating assistance in response to accident events. The method 500 may be facilitated by a server (such as the central server 105) that may communicate with vehicles and/or with electronic devices associated therewith.

The method 500 may begin with the server receiving (block 505), via at least one network connection, an indication of an accident event that occurred at an accident location. According to embodiments, the server may receive the indication of the accident event as real-time data from a damaged vehicle involved in the accident event, where the real-time data may indicate the accident event and the accident location. The server may also receive the indication of the accident event from another electronic device.

The server may optionally receive (block 510) a request indicating that an individual associated with the accident event needs assistance. Accordingly, in this implementation, the server may initiate functionality associated with facilitating assistance associated with the accident event. In particular, the server may identify (block 515) a set of vehicles currently in operation at a corresponding set of locations.

The server may, for each of the set of vehicles, access (block 520) a historical driving record for the vehicle. According to embodiments, the historical driving record may include a set of travel routes previously completed by the vehicle and data associated therewith. The server may also, for each of the set of vehicles, determine (block 525), from the historical driving record and optionally based on the location of the vehicle, a predicted travel route for the vehicle. According to embodiments, the server may determine, as the predicted travel route, a travel route of the set of the travel routes that is frequently completed by the vehicle.

The server may determine (block 530), based on the predicted travel routes, a subset of the set of vehicles predicted to travel in proximity to the accident location. In embodiments, the server may determine proximity as predicted to travel past the accident location or within a specified distance from the accident location. The server may identify (block 535), from the predicted travel routes for the subset of vehicles, a vehicle predicted to travel in proximity to the accident location. In one implementation, the server may determine, for each of the subset of vehicles based on the location of the vehicle, an amount of time for the vehicle to travel from the location to the accident location, where the server may identify the vehicle based on the amounts of time for the subset of vehicles. In another implementation, the server may identify the vehicle as the vehicle predicted to travel closest to the accident location.

The server may generate and transmit (block 540) a notification to an electronic device associated with the vehicle via at least one network connection. According to embodiments, the server may estimate an amount of time for the vehicle to reach the accident location and may determine a travel route between the location of the vehicle and the accident location, where the notification may indicate the accident event, the amount of time, and the travel route. In some implementations, the notification may indicate an incentive or reward associated with picking up the individual associated with the accident event. The server may receive (block 545), from the electronic device, an acceptance for the vehicle to pick up the individual associated with the accident event. In particular, an operator of the vehicle may use the electronic device to select to pick up the individual.

Subsequent to receiving the acceptance, the server may receive (block 550), from the electronic device, an indication that the vehicle picked up the individual. In one embodiment, either or both of the operator of the vehicle or the individual may confirm that the vehicle picked up the individual. In another embodiment, the electronic device may automatically determine that the vehicle has picked up the individual, such as via location data, occupancy data, and/or other data.

The server may identify (block 555) a reward associated with the vehicle picking up the individual. In embodiments, the reward may be in the form of a monetary amount, points or credits, discounts on products or services, recognition in some capacity, and/or other incentives or rewards. The server may apply (block 560) the reward to an account associated with the operator of the vehicle. In this regard, the operator may access the account to view and, in some cases, redeem the reward.

Figure 6:
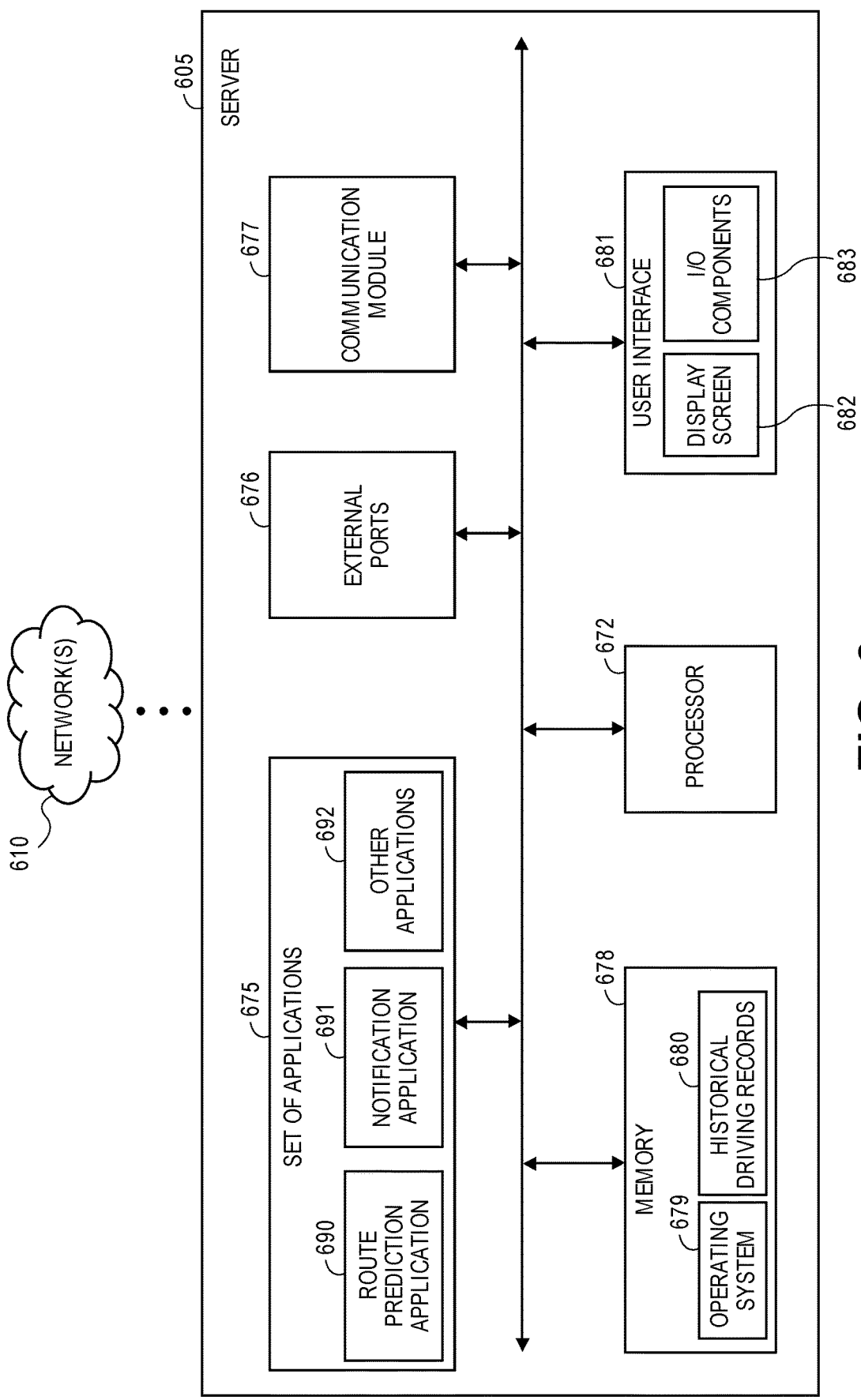
FIG. 6 is a block diagram of an exemplary server, in accordance with some embodiments.

FIG. 6 illustrates a diagram of an exemplary server 605 (such as the server 105 as discussed with respect to FIG. 1) in which the functionalities as discussed herein may be implemented. It should be appreciated that the server 605 may be configured to be connect to and communicate with various entities, components, and devices, as discussed herein.

The server 605 may include a processor 672 as well as a memory 678. The memory 678 may store an operating system 679 capable of facilitating the functionalities as discussed herein as well as a set of applications 675 (i.e., machine readable instructions). For example, one of the set of applications 675 may be a route prediction application 690 configured to determine predicted travel routes for vehicles, and one of the set of applications 675 may be a notification application 691 configured to generate and transmit notifications to vehicles. It should be appreciated that one or more other applications 692 are envisioned.

The processor 672 may interface with the memory 678 to execute the operating system 679 and the set of applications 675. According to some embodiments, the memory 678 may also include historical driving records 680 that may include data associated with previous vehicle operating data for vehicles. In some implementations, the route prediction application 690 may interface with the historical driving records 680 to estimate predicted driving routes for vehicles. The memory 678 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others.

The server 605 may further include a communication module 677 configured to communicate data via one or more networks 610. According to some embodiments, the communication module 677 may include one or more transceivers (e.g., WWAN, WLAN, and/or WPAN transceivers) functioning in accordance with IEEE standards, 3GPP standards, or other standards, and configured to receive and transmit data via one or more external ports 676. For example, the communication module 677 may receive, via the network 610, operation data from a set of vehicles. For further example, the communication module 677 may transmit notifications to electronic devices via the network 610.

The server 605 may further include a user interface 681 configured to present information to a user and/or receive inputs from the user. As shown in FIG. 6, the user interface 681 may include a display screen 682 and I/O components 683 (e.g., ports, capacitive or resistive touch sensitive input panels, keys, buttons, lights, LEDs, speakers, microphones). According to some embodiments, the user may access the server 605 via the user interface 681 to review information and/or perform other functions. In some embodiments, the server 605 may perform the functionalities as discussed herein as part of a "cloud" network or may otherwise communicate with other hardware or software components within the cloud to send, retrieve, or otherwise analyze data.

In general, a computer program product in accordance with an embodiment may include a computer usable storage medium (e.g., standard random access memory (RAM), an optical disc, a universal serial bus (USB) drive, or the like) having computer-readable program code embodied therein, wherein the computer-readable program code may be adapted to be executed by the processor 672 (e.g., working in connection with the operating system 679) to facilitate the functions as described herein. In this regard, the program code may be implemented in any desired language, and may be implemented as machine code, assembly code, byte code, interpretable source code or the like (e.g., via C, C++, Java, Actionscript, Objective-C, Javascript, CSS, XML). In some embodiments, the computer program product may be part of a cloud network of resources.

Although the following text sets forth a detailed description of numerous different embodiments, it should be understood that the legal scope of the invention may be defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a non-transitory, machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that may be permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that may be temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it may be communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment, or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment may be included in at least one embodiment. The appearances of the phrase "in one embodiment" in various places in the specification are not necessarily all referring to the same embodiment.

As used herein, the terms "comprises," "comprising," "may include," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also may include the plural unless it is obvious that it is meant otherwise.

This detailed description is to be construed as examples and does not describe every possible embodiment, as describing every possible embodiment would be impractical, if not impossible. One could implement numerous alternate embodiments, using either current technology or technology developed after the filing date of this application.

What is claimed is:

1. A computer-implemented method of facilitating assistance in response to accident events, the method comprising:
    receiving, via at least one network connection, an indication of an accident event involving a first vehicle and that occurred at an accident location;
    in response to receiving the indication, identifying, by a computer processor, a set of vehicles currently in operation at a corresponding set of locations, the set of vehicles (i) separate from the first vehicle, and (ii) not involved in the accident event;
    for each respective vehicle of the set of vehicles:
        accessing a historical driving record for the respective vehicle, and
        determining, from the historical driving record, a predicted travel route for the respective vehicle;
    identifying, from the predicted travel route for the each respective vehicle of the set of vehicles, a vehicle of the set of vehicles predicted to travel in proximity to the accident location; and
    transmitting a notification to an electronic device associated with the vehicle via at least one network connection, the notification indicating the accident event.

2. The computer-implemented method of claim 1, wherein determining the predicted travel route for the respective vehicle comprises:
    determining, from the historical driving record and based on the location of the respective vehicle, the predicted travel route for the respective vehicle.

3. The computer-implemented method of claim 1, wherein the historical driving record comprises a set of travel routes previously completed by the respective vehicle, and wherein determining the predicted travel route for the respective vehicle comprises:
    determining, as the predicted travel route, a travel route of the set of travel routes that is frequently completed by the respective vehicle.

4. The computer-implemented method of claim 1, wherein
    identifying the vehicle of the set of vehicles predicted to travel in proximity to the accident location comprises:
    determining, based on the predicted travel route, a subset of the set of vehicles predicted to travel in proximity to the accident location;
    for each respective vehicle of the subset of vehicles, determining, based on the location of the respective vehicle, an estimated amount of time for the respective vehicle to travel from the location to the accident location; and
    identifying the vehicle predicted to travel in proximity to the accident location based on the set of estimated amounts of time for the subset of vehicles.

5. The computer-implemented method of claim 1, further comprising:
    receiving, via at least one network connection, a request indicating that an individual associated with the accident event needs assistance.

6. The computer-implemented method of claim 1, further comprising:
    estimating an amount of time for the vehicle to reach the accident location;
    determining a travel route between the location of the vehicle and the accident location; and
    generating the notification, the notification indicating the accident event, the amount of time, and the travel route.

7. The computer-implemented method of claim 1, further comprising:
    receiving, from the electronic device associated with the vehicle, an acceptance for the vehicle to pick up an individual associated with the accident event; and
    subsequent to receiving the acceptance, receiving, from the electronic device associated with the vehicle, an indication that the vehicle picked up the individual.

8. The computer-implemented method of claim 7, further comprising:
    identifying a reward associated with the vehicle picking up the individual; and
    applying the reward to an account associated with an operator of the vehicle.

9. The computer-implemented method of claim 1, wherein receiving the indication of the accident event comprises:
    receiving, via the at least one network connection from the first vehicle, real-time data that indicates the accident event and the accident location.

10. A system for facilitating assistance in response to accident events, comprising:
    a transceiver configured to communicate via at least one network connection;
    a memory configured to store non-transitory computer executable instructions; and
    a processor configured to interface with the transceiver and the memory, wherein the processor is configured to execute the non-transitory computer executable instructions to cause the processor to:
        receive, via the transceiver, an indication of an accident event involving a first vehicle and that occurred at an accident location,
        in response to receiving the indication, identify a set of vehicles currently in operation at a corresponding set of locations, the set of vehicles (i) separate from the first vehicle, and (ii) not involved in the accident event,
        for each respective vehicle of the set of vehicles:
            access a historical driving record for the respective vehicle, and
            determine, from the historical driving record, a predicted travel route for the respective vehicle,
        identify, from the predicted travel route for the each respective vehicle of the set of vehicles, a vehicle of the set of vehicles predicted to travel in proximity to the accident location, and
        transmit, via the transceiver, a notification to an electronic device associated with the vehicle, the notification indicating the accident event.

11. The system of claim 10, wherein to determine the predicted travel route for the respective vehicle, the processor is configured to:
    determine, from the historical driving record and based on the location of the respective vehicle, the predicted travel route for the respective vehicle.

12. The system of claim 10, wherein the historical driving record comprises a set of travel routes previously completed by the respective vehicle, and wherein to determine the predicted travel route for the respective vehicle, the processor is configured to:

determine, as the predicted travel route, a travel route of the set of travel routes that is frequently completed by the respective vehicle.

13. The system of claim 10, wherein to identify the vehicle of the set of vehicles predicted to travel in proximity to the accident location, the processor is configured to:

determine, based on the predicted travel route, a subset of the set of vehicles predicted to travel in proximity to the accident location, for each respective vehicle of the subset of vehicles, determine, based on the location of the respective vehicle, an estimated amount of time for the respective vehicle to travel from the location to the accident location, and identify the vehicle predicted to travel in proximity to the accident location based on the set of estimated amounts of time for the subset of vehicles.

14. The system of claim 10, wherein the processor is further configured to:

receive, via the transceiver, a request indicating that an individual associated with the accident event needs assistance.

15. The system of claim 10, wherein the processor is further configured to:

estimate an amount of time for the vehicle to reach the accident location, determine a travel route between the location of the vehicle and the accident location, and generate the notification, the notification indicating the accident event, the amount of time, and the travel route.

16. The system of claim 10, wherein the processor is further configured to:

receive, from the electronic device associated with the vehicle, an acceptance for the vehicle to pick up an individual associated with the accident event, and subsequent to receiving the acceptance, receive, from the electronic device associated with the vehicle, an indication that the vehicle picked up the individual.

17. The system of claim 16, wherein the processor is further configured to:

identify a reward associated with the vehicle picking up the individual, and apply the reward to an account associated with an operator of the vehicle.

18. The system of claim 10, wherein to receive the indication of the accident event, the processor is configured to:

receive, via the transceiver from the first vehicle, real-time data that indicates the accident event and the accident location.

* * * * *